(12) United States Patent
Kobayashi et al.

(10) Patent No.: US 6,591,708 B2
(45) Date of Patent: Jul. 15, 2003

(54) GEAR MADE OF FIBER REINFORCED RESIN AND METHOD FOR MANUFACTURING SAME

(75) Inventors: Naomi Kobayashi, Tokyo (JP); Syouji Sawai, Tokyo (JP); Hiroshi Ueda, Tokyo (JP)

(73) Assignee: Shin-Kobe Electric Machinery Co., Ltd., Tokyo (JP)

(*) Notice: Subject to any disclaimer, the term of this patent is extended or adjusted under 35 U.S.C. 154(b) by 109 days.

(21) Appl. No.: 09/824,176

(22) Filed: Apr. 2, 2001

(65) Prior Publication Data

US 2001/0030381 A1 Oct. 18, 2001

(30) Foreign Application Priority Data

Apr. 12, 2000 (JP) ........................................ 2000-111293

(51) Int. Cl.[7] .................... F16H 55/12; B32B 27/12; B29C 33/40
(52) U.S. Cl. ...................... 74/446; 74/439; 74/DIG. 10; 264/257; 428/193; 428/474.4
(58) Field of Search .................... 74/439, 446, DIG. 10; 428/193, 474.4, 35.7, 36.4; 264/257, 140, 152, 239

(56) References Cited

U.S. PATENT DOCUMENTS

| | | | | |
|---|---|---|---|---|
| 3,651,705 A | * | 3/1972 | Bertinetti et al. | ............. 74/446 |
| 3,867,852 A | * | 2/1975 | Schopf | ........................ 74/446 |
| 5,059,464 A | * | 10/1991 | Mikuni | .................. 74/DIG. 10 |
| 5,098,346 A | | 3/1992 | Redmond | |
| 5,114,769 A | | 5/1992 | Kani et al. | |
| 6,425,455 B1 | * | 7/2002 | Kurokawa et al. | ............. 74/446 |

FOREIGN PATENT DOCUMENTS

| | | | |
|---|---|---|---|
| DE | 40 03 178 A1 | 9/1990 | |
| EP | 0 2206 600 A2 | 12/1986 | |
| EP | 0 271 146 A2 | 6/1988 | |
| EP | 0 824 061 A2 | 2/1998 | |
| JP | 6042608 | * 2/1994 | ............ 74/DIG. 10 |
| JP | 6-210756 | 8/1994 | |
| JP | 7-113458 | 5/1995 | |
| JP | 8-156124 | 6/1996 | |
| JP | 8-197630 | 8/1996 | |
| JP | 10-299865 | 11/1998 | |

* cited by examiner

Primary Examiner—Thomas R. Hannon
(74) Attorney, Agent, or Firm—Pearne & Gordon LLP

(57) ABSTRACT

A gear made of fiber reinforced resin which is capable of being increased in durability and mechanical strength, as well as gear cutting characteristics. The gear is manufactured by arranging ring-like reinforcing fiber substrates and a metal bushing in a molding die and pouring thermosetting resin into the die to impregnate the reinforcing fiber substrates with the resin. The reinforcing fiber substrates are made by winding up a cylindrical body obtained by knitting an aramid fiber yarn along a central line thereof and then forming it into a ring-like shape. The reinforcing fiber substrates are pressed in a cold die so as to approach to a shape of the molding die, to thereby be formed into a rectangular shape in cross section. Then, the reinforcing fiber substrates are received together with the metal bushing in the molding die and then the thermosetting resin is poured into the molding die. The reinforcing fiber substrates each have a volume percentage of 30 to 65% and preferably 45 to 55% based on a volume of a resin molded member. A para-type aramid fiber and an organic fiber reduced in strength as compared with the aramid fiber are blended together to form a union yarn. The para-type aramid fiber has a mass percentage of 30% to 60% by mass and preferably 40% to 50% by mass based on a mass of the union yarn.

15 Claims, 5 Drawing Sheets

FIG. 8
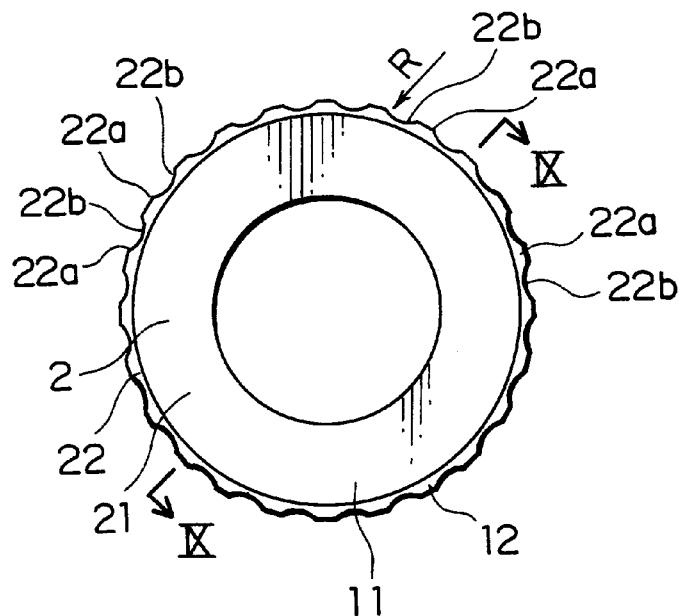
FIG. 9
FIG. 10
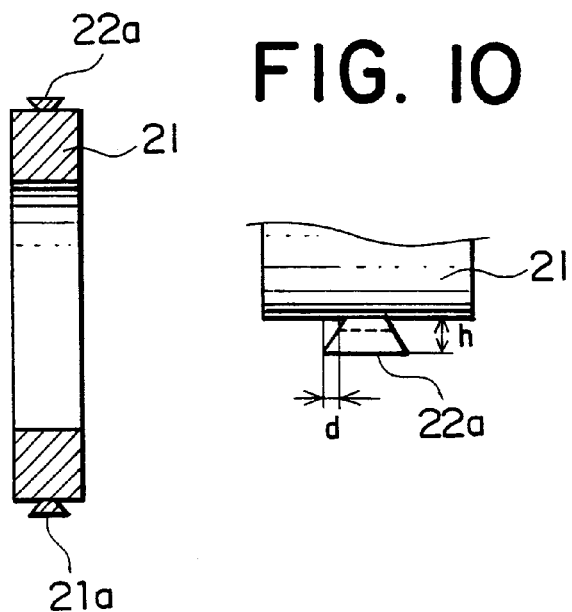

GEAR MADE OF FIBER REINFORCED RESIN AND METHOD FOR MANUFACTURING SAME

BACKGROUND OF THE INVENTION

This invention relates to a gear made of fiber reinforced resin or a resin gear, and more particularly to a gear constituted by a bushing made of metal and a gear body which includes a core made of a reinforcing fiber substrate and formed into a ring-like shape and is integrally arranged on an outside of the metal bushing.

There has been conventionally known in the art techniques of forming resin into a gear body by compression molding while using a reinforcing resin substrate made of an aramid fiber as a core. For example, techniques of preparing a prepreg by previously impregnating a sheet-like non-woven fabric made of a blend material of a para-type aramid fiber and a meta-type aramid fiber with phenolic resin, rounding the prepreg into a bar-like shape and mating or matching both ends of the thus-rounded prepreg with each other to form the prepreg into a ring-like shape, resulting in providing a reinforcing fiber substrate are disclosed in Japanese Patent Application Laid-Open Publication No. 113458/1995. Unfortunately, the reinforced fiber substrate constituted of such a non-woven fabric fails to exhibit enhanced mechanical strength. Also, the prepreg causes flowing of the resin impregnated therein, leading to deformation of the reinforcing fiber substrate, so that the reinforcing fiber substrate spreads to a portion of the metal bushing positioned in proximity to a corner thereof defined between an outer peripheral surface of the metal bushing and a side surface thereof. This causes the reinforcing fiber substrate and resin to project to the side surface of the metal bushing, although it permits an increase in bonding strength between the gear body and the metal bushing.

In order to solve the problem, techniques that a cylindrical body made of a woven or knitted fabric of an aramid fiber yarn (a blended yarn or union yarn of a meta-type aramid fiber yarn and a para/meta-type aramid fiber yarn) is used as a material for a reinforcing fiber substrate are proposed, as disclosed in Japanese Patent Application Laid-Open Publication No. 156124/1996. In the techniques proposed, the cylindrical body is bent into a ring-like shape along a central line thereof from one or both ends of the cylindrical body, so that the reinforcing fiber substrate is provided. Then, the reinforcing fiber substrate is placed in a molding die together with a metal bushing while keeping the metal bushing arranged at a central position of the reinforcing fiber substrate. Thereafter, liquid thermosetting resin such as epoxy resin, crosslinked polyamino amide or the like is poured into the molding die reduced in pressure, to thereby be impregnated in the reinforcing fiber substrate. Subsequently, the molding die is heated to a predetermined temperature, so that a resin molded member which includes the reinforcing fiber substrate having the resin impregnated therein and acting as a core is integrally formed on an outside of the metal bushing by cast molding. Then, the resin molded member is subjected to cutting, to thereby be formed on a periphery thereof with teeth, resulting in a resin gear being provided. The thus-manufactured resin gear is so constructed that the reinforcing fiber substrate is formed into a continuous ring-like shape without any joint. Such construction permits the gear to entirely exhibit uniform strength. Also, in Japanese Patent Application Laid-Open Publication No. 156124/1996 described above, techniques of subjecting the above-described blended yarn or union yarn to plain weaving, to thereby prepare a sheet-like fabric and winding the fabric into a bar-like member, of which both ends are matched with each other to provide a ring-like reinforcing fiber substrate are disclosed as a comparative example as shown in FIG. 2 thereof The reinforcing fiber substrate thus obtained is placed in a molding die, resulting in a resin molded member being formed by compression molding in a manner like the above.

Further, additional techniques are proposed as disclosed in Japanese Patent Application Laid-Open Publication No. 299865/1998, wherein such a cylindrical body as described above is made of a woven fabric and formed into a shape like a bellows. Then, the thus-formed cylindrical body is wound up from one end thereof, to thereby be formed into a ring-like shape. The woven fabric is made of a blended or union aramid yarn constituted by a meta-type aramid fiber and a para-type aramid fiber. More detailed description of the fibers is not made in the publication. In the techniques disclosed, a ring-like reinforcing fiber substrate is placed in a temporary molding die prior to arrangement thereof in a molding die, resulting in being formed into a predetermined configuration.

The above-described aramid fiber yarn obtained by blending of the meta-type aramid fiber and para-type aramid fiber and used for the cylindrical body permits the gear made of resin to be increased in strength and durability. However, an increase in proportion of the para-type aramid fiber in the aramid fiber yarn causes cutting operation for formation of teeth of the gear to be deteriorated, although it increases strength of the gear as described above. Also, it tends to cause the aramid fiber yarn to be left on a cut surface of the teeth without being cut out during the cutting operation. Further, the aramid fiber yarn thus having failed to be cut out is caused to be pulled during the cutting operation, to thereby be drawn out of the reinforcing fiber substrate, resulting in the reinforcing fiber substrate and resin being separated or peeled from each other at an interface therebetween. Such peeling causes moisture or the like to intrude into the resin gear, leading to a deterioration in durability of the resin gear.

SUMMARY OF THE INVENTION

The present invention has been made in view of the foregoing disadvantage of the prior art.

Accordingly, it is an object of the present invention to provide a gear made of fiber reinforced resin or a resin gear which is capable of exhibiting enhanced mechanical strength and service durability while optimizing a construction of a reinforcing fiber substrate formed into a ring-like shape.

It is another object of the present invention to provide a gear made of fiber reinforced resin or a resin gear which is capable of enhancing bonding strength between a metal bushing and a resin molded member.

In accordance with one aspect of the present invention, a resin gear or a gear made of fiber reinforced resin is provided. The resin gear includes a metal bushing and a gear body made of resin and arranged on an outside of the metal bushing. The gear body includes a resin molded member integrally made of a material containing thermosetting resin as a part thereof and formed on an outer periphery thereof with a plurality of teeth. The resin molded member is formed by cast molding while using at least one reinforcing fiber substrate formed into a ring-like shape as a core thereof. The reinforcing fiber substrate is constituted by a fabric selected from the group consisting of a knitted fabric of a union yarn made of a para-type aramid fiber and an organic fiber reduced in strength as compared with the para-type aramid fiber and a woven fabric thereof.

In the present invention, the reinforcing fiber substrate has a volume percentage of 30% to 65% by volume based on a volume of the resin molded member. Also, the para-type aramid fiber has a mass percentage of 30% to 60% by weight based on a mass of the union yarn.

In a preferred embodiment of the present invention, the reinforcing fiber substrate is constituted by the knitted fabric and the reinforcing fiber substrate has a volume percentage of 30% to 65% by volume based on a volume of the resin molded member.

In a preferred embodiment of the present invention, the ring-like shape of the reinforcing fiber substrate may be obtained by winding up a cylindrical body made of the knitted fabric along a central line thereof from at least one end thereof. The reinforcing fiber substrate may have a volume percentage of 45% to 55% by volume based on a volume of the resin molded member. Alternatively, the ring-like shape of the reinforcing fiber substrate may be obtained by matching or mating both ends of a bar-like member formed by winding the knitted fabric with each other, wherein the reinforcing fiber substrate has a volume percentage of 45% to 55% by volume based on a volume of the resin molded member.

In a preferred embodiment of the present invention, the ring-like shape of the reinforcing fiber substrate may be obtained by winding up a cylindrical body made of the woven fabric along a central line thereof from at least one end thereof. The reinforcing fiber substrate may have a volume percentage of 40% to 65% by volume based on a volume of the resin molded member. Alternatively, the ring-like shape of the reinforcing fiber substrate may be obtained by matching both ends of a bar-like member formed by winding the woven fabric with each other, wherein the reinforcing fiber substrate has a volume percentage of 40% to 65% by volume based on a volume of the resin molded member.

When each of the knitted fabric and woven fabric is used for the reinforcing fiber substrate, the para-type aramid fiber preferably has a mass percentage of 40 to 50% by mass based on a mass of the union yarn.

Such formation of the reinforcing fiber substrate as described above in the present invention permits the reinforcing fiber substrate to be deformed by a pressure produced due to closing of the molding die at the time of cast molding, resulting in the reinforcing fiber substrate being fitted on the outer periphery of the metal bushing. Also, the above-described construction of the reinforcing fiber substrate prevents the reinforcing fiber substrate from projecting beyond a corner between a side surface thereof and the outer periphery of the metal bushing when the liquid resin is poured into the molding die and when the resin is cured. This keeps the reinforcing fiber substrate from being partially lacking at a joint interface between the resin molded member and the metal bushing, to thereby ensure uniform joint strength therebetween.

A mass percentage of the para-type aramid fiber defined within the above-described range not only ensures the above-described advantage, but eliminates a disadvantage that the aramid fiber yarn is left on a cut surface of the teeth without being cut out during the cutting operation, to thereby be drawn out of the reinforcing fiber substrate, resulting in the reinforcing fiber substrate and resin being separated or peeled from each other at an interface therebetween. Also, it permits the para-type aramid fiber to sufficiently exhibit increased strength, to thereby ensure both satisfactory processing characteristics and increased mechanical strength of the reinforcing fiber substrate.

Thus, when a volume percentage of the reinforcing fiber substrate is below the above-described lower limit, the resin gear of the present invention fails to prevent a region occupied by only the resin from being present in the resin molded member, whereas a volume percentage of the reinforcing fiber substrate above the above-described upper limit causes the resin to be insufficiently impregnated in the reinforcing fiber substrate. When the knitted fabric is used for the reinforcing fiber substrate, the reinforcing fiber substrate is readily expanded or stretched by a pressure produced due to closing of the molding die because the knitted fabric is stretchable. This permits the reinforcing fiber substrate and resin to be distributed in the resin molded member as uniformly as possible. Thus, formation of the knitted fabric into the reinforcing fiber substrate permit a range of a volume percentage of the reinforcing fiber substrate to be enlarged as compared with that by the woven fabric.

In a preferred embodiment of the present invention, the metal bushing preferably includes a cylindrical body and a detachment-preventing section integrally provided on a central portion of an outer periphery of the cylindrical body in a manner to extend in a radial direction of the cylindrical body. The detachment-preventing section of the metal bushing includes a plurality of recesses and a plurality of projections arranged alternately in a peripheral direction of the cylindrical body. The recesses each are formed into an arcuate shape or a shape curved so as to project inwardly in the radial direction of the cylindrical body as viewed in a direction perpendicular to the radial direction and peripheral direction. Two such reinforcing fiber substrates are superposed on each other in a manner to interpose the detachment-preventing section of the metal bushing therebetween and be contacted at a portion thereof positioned outwardly in a radial direction of the detachment-preventing section with each other. The recesses and projections cooperate with each other to prevent two such reinforcing fiber substrates from moving or rotating around the metal bushing. Also, the thus-constructed detachment-preventing section prevents the reinforcing fiber substrates from detaching from the metal bushing. In particular, formation of the recesses into the above-described configuration permits a part of each of the reinforcing fiber substrates to smoothly enter the recesses along a curved surface of the recesses, to thereby ensure that the reinforcing fiber substrates may be satisfactorily filled in the recesses. The recesses each have no angular or sharp portion formed therein, to thereby prevent each of the recesses from being formed therein a resin-rich portion which is formed of only the resin without being filled with the reinforcing fiber substrate. This eliminates a deterioration in bonding strength between the metal bushing and resin molded member.

In particular, the projections each may be formed into an undercut shape which permits a width of the projection in cross-section defined in a direction perpendicular to the peripheral direction to be gradually increased outwardly in the radial direction. This further enhances both detachment-preventing and rotation-preventing functions of the detachment-preventing section. Further, in a preferred embodiment of the present invention, the projections each may be so formed that the smallest distance d between an intersection between a virtual line defined so as to extend from an edge of a top surface of the projection toward a center of the cylindrical body and the outer periphery and a line formed due to intersection between a side surface of the projection and the outer periphery is within a range of between 30% and 85% based on a thickness h of the projection in the radial direction. Such configuration exhibits various advantages. More specifically, rotation of the gear leads to generation of stress which tends to cause the projections to shear the resin molded member. Formation of each of the projections into the undercut shape permits an increase in area of the resin molded member at a joint between the metal bushing and the resin molded member, leading to an increase in resistance to stress of the resin molded member. Resin is generally increased in thermal expansion coefficient as compared with metal. Thus, an increase in temperature causes generation of stress which tends to separate the resin molded member from the metal bushing due to a difference in thermal expansion therebetween. However, formation of the projection into the undercut configuration effectively eliminates the above-described separation of the resin molded member from the metal bushing. When the smallest distance d is below 30% based on the thickness h of the projection, the above-described advantage of increasing the resistance to stress is deteriorated; whereas the distance d above 85% of the thickness h leads to a reduction in mechanical strength of a base of the projection.

In accordance with another aspect of the present invention, a method for manufacturing a gear made of fiber reinforced resin is provided. The method includes the step of arranging a metal bushing and a ring-like reinforcing fiber substrate in a molding die while positioning the reinforcing fiber substrate outside the metal bushing. The reinforcing fiber substrate is made of a fabric selected from the group consisting of a knitted fabric of a union yarn made of a para-type aramid fiber and an organic fiber reduced in strength as compared with the para-type aramid fiber and a woven fabric thereof. The method further includes the steps of pouring thermosetting resin into the die which is previously heated, followed by application of heat to the die to prepare a resin molded member integrated with the metal bushing and forming a plurality of teeth on an outer periphery of the resin molded member. The reinforcing fiber substrate has a volume percentage of 65% by volume or less based on a volume of the resin molded member and the para-type aramid fiber has a mass percentage of 30% to 60% by weight based on a mass of the union yarn. The method further includes the step of pressing the reinforcing fiber substrate into a configuration approaching to that of the resin molded member formed by the die prior to arrangement of the reinforcing fiber substrate in the die.

Receiving of the reinforcing fiber substrate in the molding die causes the reinforcing fiber substrate to be hard to move therein. Thus, the above-described arrangement of the reinforcing fiber substrate in the molding die after pressing of the reinforcing fiber substrate into a shape approaching to that of the molding die prevents the gear from having a portion occupied by only the resin. Also, it minimizes projection of the reinforcing fiber substrate to an upper surface of the metal bushing.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIG. 8 is a plan view showing a metal bushing suitably incorporated in a resin gear of the present invention;

FIG. 9 is a sectional view taken along line IX—IX of FIG. 8; and

FIG. 10 is a fragmentary schematic view showing a configuration of a metal bushing.

DETAILED DESCRIPTION OF THE PREFERRED EMBODIMENTS

Now, the present invention will be described with reference to the accompanying drawings.

Figure 1:
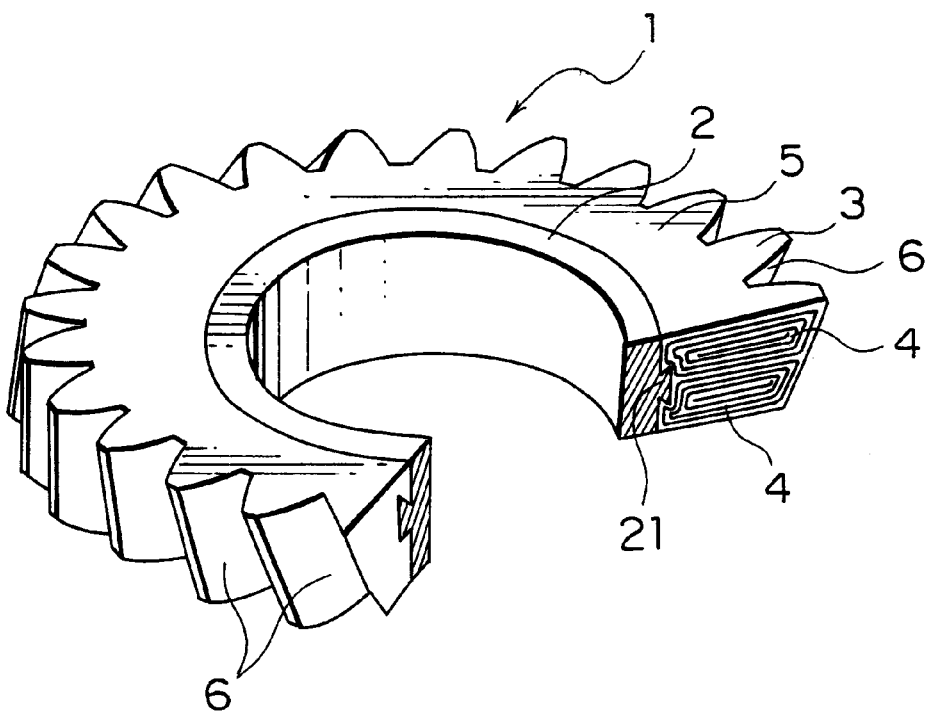
FIG. 1 is a partly cutaway perspective view showing an embodiment of a resin gear according to the present invention.
Figure 2:
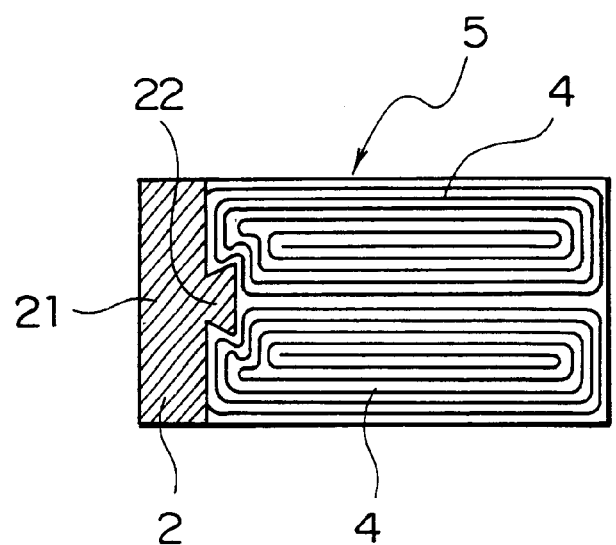
FIG. 2 is an enlarged sectional view of the resin gear shown in FIG. 1.

Referring first to FIGS. 1 and 2, an embodiment of a gear made of fiber reinforced resin or a resin gear according to the present invention is illustrated. A resin gear of the illustrated embodiment generally designated at reference numeral 1 generally includes a metal bushing 2 and a gear body made of resin or a resin gear body which is designated at reference numeral 3. The resin gear body 3 is arranged on an outside of the metal bushing 2. The resin gear body 3 includes a resin molded member 5 integrally formed of thermosetting resin by cast molding while using at least one ring-like reinforcing fiber substrate 4 as a core. In the illustrated embodiment, two such ring-like reinforcing fiber substrates 4 are used as a core. Also, the resin molded member 5 is formed on an outer periphery thereof with a plurality of teeth 6.

The metal bushing 2 of the resin gear 1, as shown in FIG. 2, includes a cylindrical body 21 and a detachment-preventing section 22 provided on a central portion of an outer periphery of the cylindrical body 21 in a manner to be integral with the cylindrical body 21 and extend in a radial direction of the cylindrical body 21. The detachment-preventing section 22 of the metal bushing 2 is formed into an annular configuration and includes a plurality of recesses and a plurality of projections alternately arranged in a peripheral direction of the cylindrical body 21. The projections each are formed into a dovetail shape in section or a shape in cross section which permits a width thereof to be gradually increased outwardly in a radial direction of the cylindrical body 21. The detachment-preventing section 22 will be described more in detail hereinafter. The resin molded member 5 is so constructed that the reinforcing fiber substrates 3 are superposed on each other in a manner to interpose the detachment-preventing section 22 of the metal bushing 2 therebetween and be contacted at a portion thereof positioned outwardly in a radial direction of the detachment-preventing section 22 with each other. In the illustrated embodiment, a volume percentage of the reinforcing fiber substrates 3 in the resin molded member 5 based on a volume thereof is set to be appropriate as described hereinafter, resulting in preventing the resin molded member 5 from having a portion occupied by only the resin. Also, it keeps impregnation of the resin in the reinforcing fiber substrates 4 from being insufficient.

The reinforcing fiber substrates 4 each are constituted by a fabric selected from the group consisting of a knitted fabric made of a union yarn made of both a para-type aramid fiber and an organic fiber reduced in strength as compared with the para-type aramid fiber and a woven fabric of the union yarn. The organic fibers reduced in strength which are mixed with the para-type aramid fibers include a meta-type aramid fiber and a polyester fiber. In the illustrated embodiment, for this purpose, a union yarn constructed of the para-type aramid fiber and meta-type aramid fiber may be used by way of example. The union yarn may have a thickness of about 20 in cotton yarn number (based on Japanese Industry Standard L0208). The para-type aramid fiber for the union yarn may have a fiber length of 50 mm and a fiber diameter of 16 μm. Such a para-type fiber may be commercially available under a trademark "TECHNOLA" from TEIJIN LTD. Also, the meta-type aramid may have a fiber length of 50 mm, a fiber diameter of 16 μm and a softening point of 270° C. to 280° C. and be commercially available under a trademark "CORNEX" from TEIJIN LTD. The para-type aramid fiber may have a mass percentage of, for example, 30% to 60% by weight based on a mass of the union fiber. Preferably, it has a mass percentage of 40% to 50% by mass based on a mass of the paratype aramid fiber.

Figure 3:
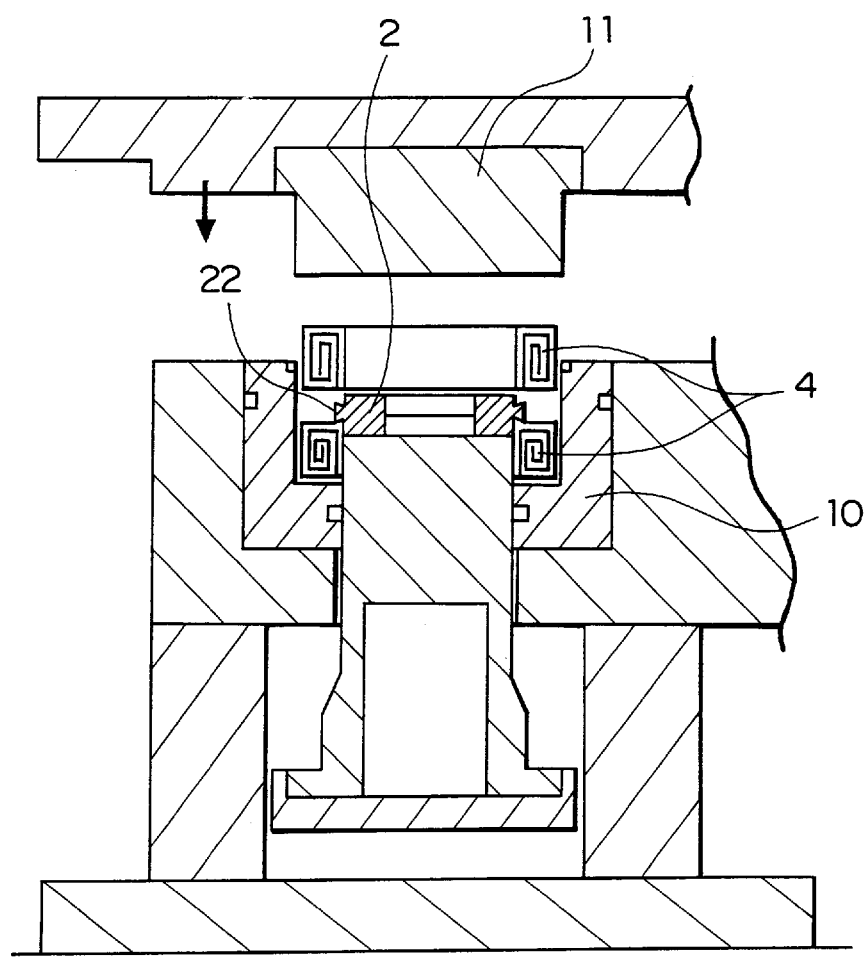
FIG. 3 is a schematic sectional view showing an apparatus for manufacturing a resin gear according to the present invention by way of example.
Figure 4:
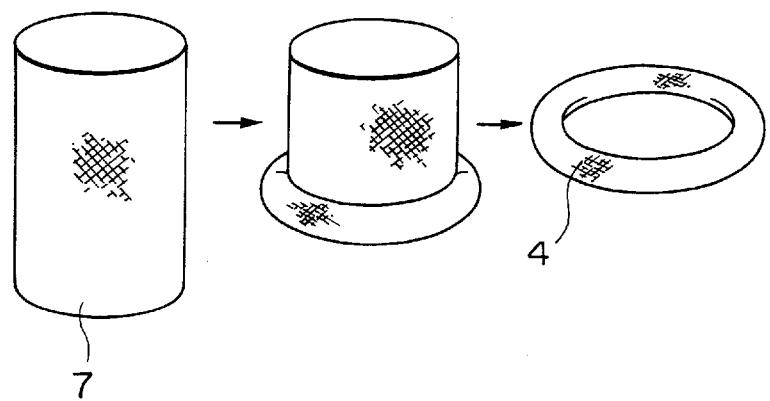
FIG. 4 is a schematic view showing manufacturing of an example of a reinforcing fiber substrate suitable for use for manufacturing of a resin gear according to the present invention.

Manufacturing of the resin gear 1 made of such fiber reinforced resin may be carried out by means of a manufacturing apparatus constructed as shown in FIG. 3 by way of example. Also, the reinforcing fiber substrate 4 may be manufactured in such a manner as shown in FIG. 4. Such manufacturing of the resin gear 1 and reinforcing fiber substrate 4 are inherently known as disclosed in Japanese Patent Application Laid-Open Publication No. 156124/1996. Thus, the manufacturing will be briefly described.

First, a cylindrical body 7 is formed of either a knitted fabric made of the above-described union yarn or a woven fabric of the union yarn. Then, the cylindrical body 7 is wound up along a central line thereof from one end thereof, to thereby be formed into a ring-like shape, resulting in the reinforcing fiber substrate 4 being obtained. Alternatively, winding-up of the cylindrical body 7 may be carried out from both ends thereof as disclosed in Japanese Patent Application Laid-Open Publication No. 156124/1996.

Figure 5:
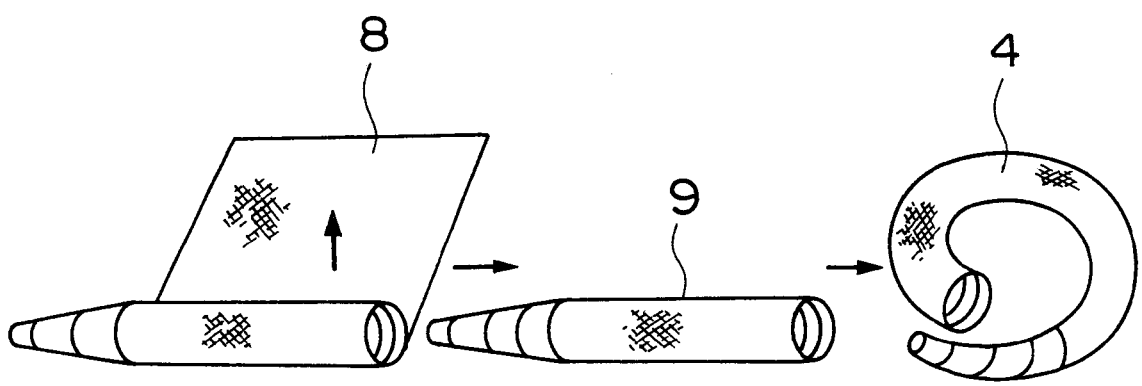
FIG. 5 is a schematic view showing manufacturing of another example of a reinforcing fiber substrate suitable for use for manufacturing of a resin gear according to the present invention.

Alternatively, the reinforcing fiber substrate 4 may be manufactured in such a manner as shown in FIG. 5. Manufacturing shown in FIG. 5 is likewise known in the art as disclosed in Japanese Patent Application Laid-Open Publication No. 113458/1995. Thus, it will be briefly described. First of all, a sheet 8 made of either a knitted fabric of the union yarn or a woven fabric thereof is wound to form a bar-like member 9. Then, both ends of the thus-formed bar-like member 9 are matched or associated with each other, to thereby be formed into a ring-like shape, resulting in providing the reinforcing fiber substrate 4.

The reinforcing fiber substrate 4 thus formed has a substantially circular shape in cross section. Manufacturing of the resin gear by means of the apparatus shown in FIG. 3 is preferably carried out by previously pressing the reinforcing fiber substrate 4 by means of a cold die so as to form it into a shape resembling a female molding die 10, to thereby permit it to be configured into a rectangular shape in section as shown in FIG. 3 and then arranging it in the female molding die 10. Nevertheless, it is a matter of course that the reinforcing fiber substrate 4 may be arranged in the female molding die 10 without being subjected to such preforming.

Now, manufacturing of the resin gear by means of the apparatus shown in FIG. 3 will be described. First, as shown in FIG. 3, one of the reinforcing fiber substrates 4 which have been into a rectangular shape in section is placed in the female molding die 10 and then the metal bushing 2 is arranged at a central position in the female molding die 10. Then, the other reinforcing fiber substrate 4 is arranged in the female molding die 10 so as to interpose the detachment-preventing section 22 of the metal bushing 2 between both reinforcing fiber substrates 4, so that both reinforcing fiber substrates 4 may be superposed on each other. Subsequently, the female molding die 10 is closed with a male molding die 11. Closing of the female molding die 10 with the male molding die 11 produces a pressure, which permits compressive deformation of the reinforcing fiber substrates 4, so that the reinforcing fiber substrates 4 may be tightly joined to the outer periphery of the metal bushing 2. Thereafter, a pressure in an assembly of the male and female molding dies 10 and 11 combined or mated with each other is reduced to a level as low as 1300 Pa and then liquid thermosetting resin such as crosslinked polyamino amide, epoxy resin, polyimide or the like is poured into the molding die assembly to impregnate the reinforcing fiber substrates 4 with the resin and fill the female molding die 10 with the resin. Then, the die assembly is heated at a temperature which permits curing of the resin. This results in the resin molded member being integrally formed on the outer periphery of the metal bushing 2. After curing of the resin, the metal bushing 2 thus integrally formed thereon with the resin molded member is removed from the die assembly. Then, the resin molded member including the reinforcing fiber substrates 4 is subjected on an outer peripheral portion thereof to cutting, leading to formation of the teeth on the resin molded member, resulting in the resin gear being completed.

Now, tests carried out by the inventors will be described hereinafter.

A cylindrical member was formed of a union yarn constituted by the above-described para-type aramid fiber and meta-aramid fiber. The para-type aramid fiber was contained in an amount of 45% by mass in the union yard. The cylindrical member was prepared by circular knitting. Then, the cylindrical member was wound up along a central line thereof, to thereby be formed into a ring-like shape. Subsequently, the cylindrical member thus rounded was pressed by means of a cold die or hot die, to thereby be formed into a rectangular shape in cross section. Thus, two reinforcing fiber substrates were obtained. Then, the reinforcing fiber substrates and a metal bushing were integrated with each other in such a manner as described above with reference to FIG. 3. The reinforcing fiber substrates were impregnated with crosslinked polyamino amide (liquid resin). The amount of liquid resin poured into the molding die 10 was varied, to thereby obtain first resin gears different in volume percentage of the reinforcing fiber substrate from each other. Resin molded members each including the reinforcing fiber substrates were formed into dimensions of 90 mm in outer diameter, 60 mm in inner diameter and 14 mm in thickness.

Second resin gears were manufactured by substantially repeating the above-described procedure, except that a union yarn formed of the above-described para-type aramid fiber and meta-type aramid fiber wherein the para-type aramid was contained in an amount of 45% by mass was subjected to plain weaving, to thereby obtain a cylindrical body.

Figure 6:
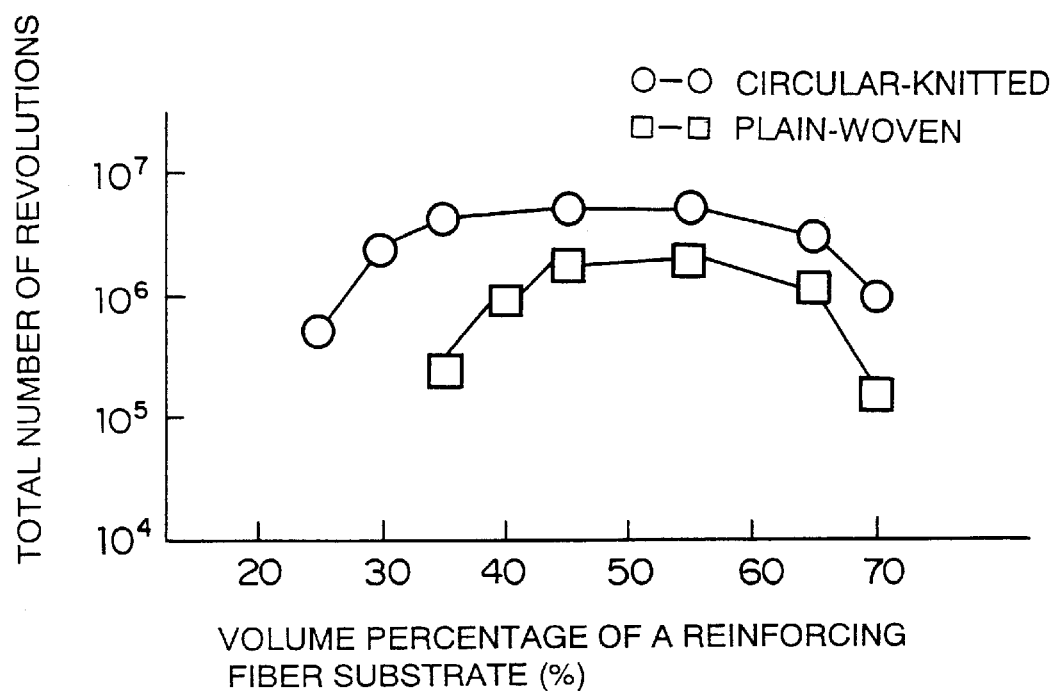
FIG. 6 is a graphical representation showing relationship between a volume percentage of a reinforcing fiber substrate and durability of a resin gear.

Then, the first resin gears including the reinforcing fiber substrates made of the circular-knitted cylindrical body and the second resin gears including the reinforcing fiber substrates made of the plain-woven cylindrical body (module (M)=3.0 and the number of teeth (Z)=22) were subjected to a durability test, to thereby determine relationship between a volume percentage of each of the reinforcing fiber substrates based on a volume of the resin molded member and durability of each of the resin gears. The durability test was carried out by continuously rotating each of the gears at a speed of 6000 rpm in oil at a temperature of 130° C. while applying load to the gear so as to permit stress of 200 Mpa to be applied to a dedendum of each of the teeth, to thereby measure the total number of revolutions of the gear which causes breaking of the gear. The results were as shown in FIG. 6. In FIG. 6, ○ indicates results of measurement carried out on the first resin gears including the reinforcing fiber substrates made of the circular-knitted cylindrical body and □ indicates those on the second resin gears including the reinforcing fiber substrates made of the plain-woven cylindrical body.

As will be noted from FIG. 6, the first resin gears including the reinforcing fiber substrates made of the circular-knitted cylindrical body exhibited enhanced durability when the reinforcing fiber substrate in the resin molded member has a volume percentage of 30% to 65% by volume based on a volume of the resin molded member. In particular, the durability was significantly increased when the volume percentage is between 45% by volume and 55% by volume. Also, FIG. 6 reveals that the second resin gears including the reinforcing fiber substrates made of the plain-woven cylindrical body were increased in durability when the reinforcing fiber substrate in the resin molded member has a volume percentage of 40% to 65% by volume based on a volume of the resin molded member. The gear including the reinforcing fiber substrates made of the knitted fabric and that including the reinforcing fiber substrates made of the woven fabric which were manufactured in the manner shown in FIG. 5 exhibited results having a tendency like those shown in FIG. 6.

Figure 7:
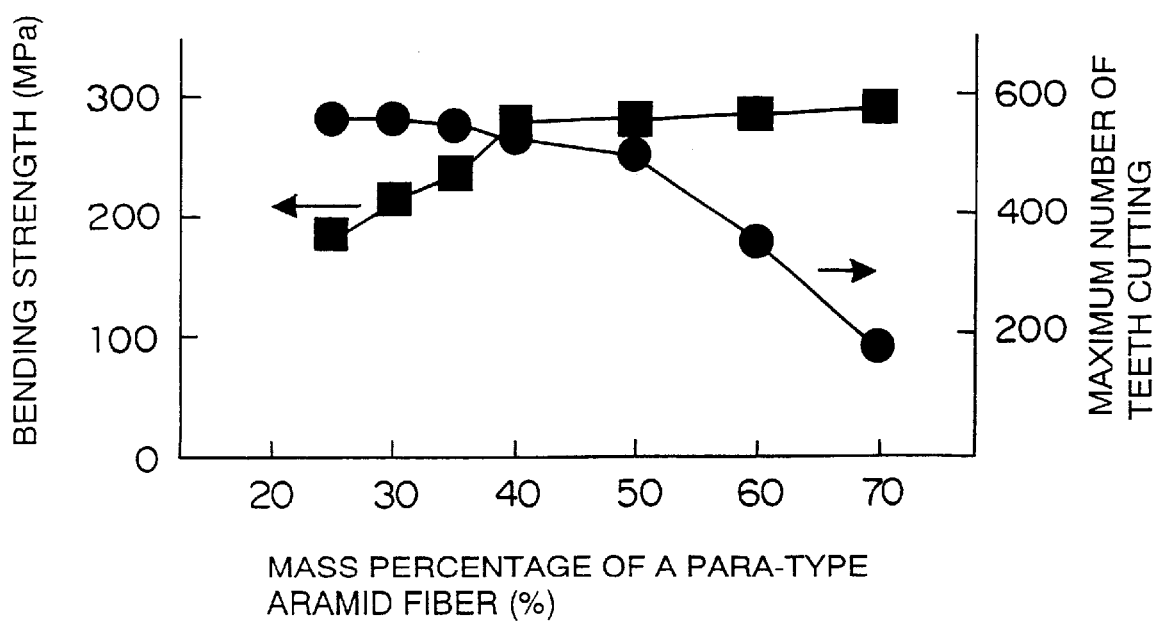
FIG. 7 is a graphical representation showing relationship between a mass percentage of a para-type aramid fiber based on a mass of a union yarn and bending strength of a resin gear and between the mass percentage and gear cutting characteristics of the resin gear.

Further, a plurality of resin gears respectively including reinforcing fiber substrates formed of plain-woven cylindrical bodies different in blending ratio between the above-described para-type aramid fiber and the above-described meta-type aramid fiber (a mass percentage of the para-type aramid fiber based on a union yarn) from each other while keeping a volume percentage of the reinforcing fiber substrate based on a volume of the resin molded member at a level of 50% by volume were manufactured. Then, fan-shaped specimens each were prepared by cutting each of the thus-obtained resin gears into segments having an arcuate angle of 90 degrees. The specimens were subjected to both a flexural strength test and a gear cutting test. The flexural strength test was carried out for the purpose of obtaining relationship between a mass percentage of the para-type aramid fiber based on a mass of the union yarn and flexural strength of the gear. The gear cutting test was made in order to obtain relationship between a mass percentage of the para-aramid fiber based on a mass of the union yarn and a maximum number of teeth capable of being formed without replacing a cutting tool. The results were as shown in FIG. 7. The flexural strength test was carried out in a manner to support an outer periphery of each of the fan-shaped specimens while keeping the specimens separated from each other at a distance of 40 mm in a peripheral direction thereof, and applying pressing forced to each of the specimens from a side of an inner periphery thereof at a speed of 2 mm/min, to thereby measure pressing force required for breaking the specimen.

The results were as shown in FIG. 7, which indicates that the resin gear was increased in both mechanical strength or flexural strength characteristics and gear cutting characteristics while keeping both characteristics satisfactorily balanced with each other when the para-type aramid fiber had a mass percentage of 30 to 60% by mass based on a mass of the union yarn.

The test data described above were obtained when the reinforcing fiber substrate formed of the cylindrical body made of the knitted fabric was a volume percentage of 50% by volume based on a volume of the resin molded member. Substantially the same results were obtained also when the reinforcing fiber substrate had a volume percentage defined within the preferred range described above. Also, the resin gears including the reinforcing fiber substrates formed of the sheet made of the knitted fabric and manufactured as shown in FIG. 5 were increased in mechanical strength or flexural strength characteristics and gear cutting characteristics while keeping both characteristics satisfactorily balanced with each other when the para-type aramid fiber has a mass percentage within the above-described preferred range, particularly, when it has a mass percentage of 30 to 60% by mass based on a mass of the union yarn. Further, resin gears respectively including reinforcing fiber substrates formed of the woven fabric and made as shown in FIGS. 4 and 5 were subjected to tests under substantially the same conditions. As a results, the resin gears exhibited substantially the same tendency.

Thus, it was found that the resin gear including the reinforcing fiber substrates made in the manner shown in either FIG. 4 or FIG. 5 wherein the para-type aramid fiber has a fiber length of 30 mm to 70 mm and a fiber diameter of 6 μm to 18 μm, the organic fiber has a fiber length 30 mm to 70 mm and a fiber diameter 6 μm to 18 μm and the union yarn has a thickness of 10 to 40 in cotton yarn number (based on Japanese Industry Standard L0208) exhibits substantially the same results when the reinforcing fiber substrate has a volume percentage defined within the above-described range based on a volume of the resin molded member and a mass percentage of the para-aramid fiber based on a mass of the union yarn is within the above-described range.

Now, a preferred structure of the detachment-preventing section or mechanism 22 of the metal bushing 2 will be described with reference to FIGS. 8 to 10. The detachment-preventing section or mechanism 22 integrally provided on the outer periphery of the cylindrical body 21 is constituted by a plurality of projections 22a and a plurality of recesses 22b alternately arranged in the peripheral direction of the cylindrical body 21. 10 or more and preferably 15 or more such projections 22 may be arranged at equal intervals. In the illustrated embodiment, 24 such projections 22a are arranged at equal intervals of 15 degrees. A reduction in the number of projections 22a causes an increase in force with which each of the projections 22 shears the resin molded member, to thereby facilitate breaking of a joint between the metal bushing 2 and the resin molded member. On the contrary, an increase in the number of projections 22a leads to a reduction in the force.

The recesses 22b each are preferably formed into an arcuate shape or a shape curved so as to project inwardly in the radial direction of the cylindrical body as the detachment-preventing section 22 is viewed in a direction perpendicular to the radial direction and peripheral direction of the cylindrical body 21. In the illustrated embodiment, the recesses 22b each are formed into a substantially arcuate shape. The arc preferably has a radius of from 2 mm to 5 mm. Such configuration ensures that a part of each of the reinforcing fiber substrates smoothly enters each of the recesses 22b along a curved surface of the recess, to thereby be sufficiently filled in the recess. However, a reduction of the radius to a degree as small as about 1 mm deteriorates filling of the reinforcing fiber substrate in the recess 22b.

The detachment-preventing section 22 preferably has an average thickness about one third as large as a height of the cylindrical body 21 which is a dimension of the cylindrical body 21 in a direction thereof perpendicular to the radial and peripheral directions thereof.

In the illustrated embodiment, the projections 22a each are formed into an undercut shape which permits a width of the projection in cross-section defined in a direction perpendicular to the peripheral direction to be gradually increased outwardly in the radial direction. Also, in the illustrated embodiment, the projections each are so formed that the smallest distance d between an intersection between a virtual line defined so as to extend from an edge of a top surface of the projection toward a center of the cylindrical body and the outer periphery and a line formed due to intersection between a side surface of the projection and the outer periphery is within a range between 30% and 85% based on a thickness h of the projection in the radial direction. This enhances bonding strength between the metal bushing 2 and the resin molded member.

As can be seen from the foregoing, the resin gear of the present invention exhibits enhanced durability and mechanical strength and is increased in gear cutting characteristics during manufacturing of the gear by defining each of a volume percentage of the reinforcing fiber substrate based on a volume of the resin molded member and a mass percentage of the para-type aramid fiber based on a mass of the union yarn within a predetermined range.

What is claimed is:

1. A gear made of fiber reinforced resin, comprising:
   a metal bushing;
   a gear body made of resin and arranged on an outside of said metal bushing;
   said gear body including a resin molded member integrally made of a material containing thermosetting resin as a part thereof and formed on an outer periphery thereof with a plurality of teeth;
   said resin molded member being formed by cast molding while using at least one reinforcing fiber substrate formed into a ring-like shape as a core thereof;
   said reinforcing fiber substrate being constituted by a fabric selected from the group consisting of a knitted fabric of a union yarn made of a para-type aramid fiber and an organic fiber reduced in strength as compared with said para-type aramid fiber and a woven fabric thereof;
   said reinforcing fiber substrate having a volume percentage of 65% by volume or less based on a volume of said resin molded member;
   said para-type aramid fiber having a mass percentage of 30% to 60% by weight based on a mass of said union yarn.

2. A gear as defined in claim 1, wherein said reinforcing fiber substrate is constituted by said knitted fabric; and
   said reinforcing fiber substrate has a volume percentage of 30% to 65% by volume based on a volume of said resin molded member.

3. A gear as defined in claim 1, wherein said ring-like shape of said reinforcing fiber substrate is obtained by winding up a cylindrical body made of said knitted fabric along a central line thereof from at least one end thereof; and
   said reinforcing fiber substrate has a volume percentage of 45% to 55% by volume based on a volume of said resin molded member.

4. A gear as defined in claim 1, wherein said ring-like shape of said reinforcing fiber substrate is obtained by matching both ends of a bar-like member formed by winding said knitted fabric with each other; and
   said reinforcing fiber substrate has a volume percentage of 45% to 55% by volume based on a volume of said resin molded member.

5. A gear as defined in claim 1, wherein said ring-like shape of said reinforcing fiber substrate is obtained by winding up a cylindrical body made of said woven fabric along a central line thereof from at least one end thereof; and
   said reinforcing fiber substrate has a volume percentage of 40% to 65% by volume based on a volume of said resin molded member.

6. A gear as defined in claim 1, wherein said ring-like shape of said reinforcing fiber substrate is obtained by matching both ends of a bar-like member formed by winding said woven fabric with each other; and
   said reinforcing fiber substrate has a volume percentage of 40% to 65% by volume based on a volume of said resin molded member.

7. A gear as defined in any one of claims 1 to 6, wherein said para-type aramid fiber has a mass percentage of 40 to 50% by mass based on a mass of said union yarn.

8. A gear as defined in claim 1, wherein said reinforcing fiber substrate is pressed into a predetermined configuration prior to said compression molding.

9. A gear as defined in claim 1, wherein said thermosetting resin is selected from the group consisting of crosslinked polyamide, epoxy resin and polyimide and said organic fiber is selected from the group consisting of a meta-type aramid fiber and a polyester fiber.

10. A gear as defined in claim 1, wherein said para-type aramid fiber has a fiber length of from 30 mm to 70 mm and a fiber diameter of from 6 $\mu$m to 18 $\mu$m;
    said organic fiber has a fiber length of from 30 mm to 70 mm and a fiber diameter of from 6 $\mu$m to 18 $\mu$m; and
    said union yarn has a thickness of from 10 to 40 in cotton yarn number.

11. A gear as defined in claim 1, wherein said metal bushing includes a cylindrical body and a detachment-preventing section integrally provided on a central portion of an outer periphery of said cylindrical body in a manner to extend in a radial direction of said cylindrical body;
    said detachment-preventing section of said metal bushing being constituted by a plurality of recesses and a plurality of projections arranged alternately in a peripheral direction of said cylindrical body;
    said recesses being formed into an arcuate shape or a shape curved so as to project inwardly in the radial direction of said cylindrical body as viewed in a direction perpendicular to said radial direction and peripheral direction; and
    two said reinforcing fiber substrates are superposed on each other in a manner to interpose said detachment-preventing section of said metal bushing therebetween and be contacted at a portion thereof positioned outwardly in a radial direction of said detachment-preventing section with each other.

12. A gear as defined in claim 11, wherein the number of said projections arranged is ten or more;

said projections each are formed into an undercut shape which permits a width of said projection in cross-section defined in a direction perpendicular to said peripheral direction to be gradually increased outwardly in said radial direction.

13. A gear as defined in claim 12, wherein said projections each are so formed that the smallest distance d between an intersection between a virtual line defined so as to extend from an edge of a top surface of said projection toward a center of said cylindrical body and said outer periphery and a line formed due to intersection between a side surface of said projection and said outer periphery is within a range between 30% and 85% based on a thickness h of said projection in said radial direction.

14. A gear as defined in claim 11, wherein said recesses each are formed into said arcuate shape, of which arc has a radius of 2 mm or more.

15. A method for manufacturing a gear made of fiber reinforced resin, comprising the steps of:

arranging a metal bushing and a ring-like reinforcing fiber substrate in a die for cast molding while positioning the reinforcing fiber substrate outside the metal bushing;

said reinforcing fiber substrate being made of a fabric selected from the group consisting of a knitted fabric of a union yarn made of a para-type aramid fiber and an organic fiber reduced in strength as compared with the para-type aramid fiber and a woven fabric thereof;

pouring thermosetting resin into the die, followed by application of at least heat to the die to prepare a resin molded member integrated with the metal bushing;

forming a plurality of teeth on an outer periphery of the resin molded member;

the reinforcing fiber substrate having a volume percentage of 65% by volume or less based on a volume of the resin molded member;

the para-type aramid fiber having a mass percentage of 30% to 60% by weight based on a mass of the union yarn; and pressing the reinforcing fiber substrate into a configuration approaching to that of the resin molded member formed by the die prior to arrangement of the reinforcing fiber substrate in the die.

* * * * *